(12) United States Patent
Martignoni, III et al.

(10) Patent No.: US 9,860,489 B2
(45) Date of Patent: Jan. 2, 2018

(54) SYSTEM AND METHOD FOR GRAPHICALLY ENTERING VIEWS OF TERRAIN AND OTHER FEATURES FOR SURVEILLANCE

(71) Applicant: The Boeing Company, Chicago, IL (US)

(72) Inventors: Andrew Joseph Martignoni, III, Collinsville, IL (US); James Louis Paunicka, Bellerive Acres, MO (US)

(73) Assignee: The Boeing Company, Chicago, IL (US)

( * ) Notice: Subject to any disclaimer, the term of this patent is extended or adjusted under 35 U.S.C. 154(b) by 433 days.

(21) Appl. No.: 14/038,100

(22) Filed: Sep. 26, 2013

(65) Prior Publication Data

US 2015/0085112 A1 Mar. 26, 2015

(51) Int. Cl.
*H04N 7/18* (2006.01)
*G06T 19/00* (2011.01)
(Continued)

(52) U.S. Cl.
CPC ............ *H04N 7/18* (2013.01); *G06F 3/048* (2013.01); *G06T 19/00* (2013.01); *H04N 7/181* (2013.01);
(Continued)

(58) Field of Classification Search
CPC ............ G06F 3/048; G06T 19/00; H04N 7/18
See application file for complete search history.

(56) References Cited

U.S. PATENT DOCUMENTS

| 2004/0008253 A1* | 1/2004 | Monroe ........... G08B 13/19641 348/143 |
| 2004/0263476 A1* | 12/2004 | Lim ................ G08B 13/19682 345/157 |
| 2013/0300740 A1* | 11/2013 | Snyder ................... G06F 3/016 345/420 |

FOREIGN PATENT DOCUMENTS

MY WO 2012091537 A1 * 7/2012 ............. H04N 7/183

OTHER PUBLICATIONS

Lee et al., Control of a Remotely Operated Quadrotor Aerial Vehicle and Camera Unit Using a Fly-The-Camera Perspective, Proceedings of the 46th IEEE Conference on Decision and Control, New Orleans, LA, Dec. 12-14, 2007.
(Continued)

*Primary Examiner* — Obafemi Sosanya
(74) *Attorney, Agent, or Firm* — Kunzler, PC

(57) ABSTRACT

A surveillance system is disclosed that includes one or more data acquisition devices, an image database, and a processing system. The data acquisition devices are configured to acquire surveillance data from one or more geographic locations, and the image database stores image data for the one or more geographic locations. The processing system is configured to electronically display an image of one or more of the geographic locations using the image data stored in the image database. The processing system is further configured to accept input through a user interface to allow graphical manipulation of the displayed image in three-dimensional space to select a view of the geographical location that is to be subject to surveillance by the data acquisition devices. The displayed image selected by the user is employed to generate acquisition parameters for controlling the one or more data acquisition devices to surveil the geographical location corresponding to the displayed image.

30 Claims, 8 Drawing Sheets

(51) Int. Cl.
    *G06F 3/048*     (2013.01)
    *G08B 13/196*     (2006.01)
    *G06K 9/00*     (2006.01)

(52) U.S. Cl.
    CPC .... *G06K 9/00771* (2013.01); *G08B 13/19682* (2013.01)

(56) References Cited

OTHER PUBLICATIONS

Cervin et al., A 3D Interface for an Unmanned Aerial Vehicle, Dept. of Software Engineering, University of Auckland, Private Bag 92019, 2004.

Veltman et al., Augmenting Camera Images for Operators of Unmanned Aerial Vehicles, RTO HFM Symposium on "The Role of Humans in Intelligent and Automated Systems", held in Warsaw, Poland, Oct. 7-9, 2002, and published in RTO-MP-088.

Jain R et al., "Multiple perspective interactive video", Proceedings of the International Conference on Multimedia Computing and Systems. Washington, May 15-18, 1995; Los Alamitos, IEEE Comp. Soc. Press, US, May 15, 1995, pp. 202-211.

Boyd J E et al., "MPI-Video infrastructure for dynamic environments", Multimedia Computing and Systems, 1998. Proceedings. IEEE International Conference on Austin, TX, USA Jun 28,-Jul. 1, 1998, Los Alamitos, CA, USA, IEEE Comput. Soc, US, Jun. 28, 1998, pp. 249-254.

Katkere A et al., "VRML-Based WWW Interface to MPI Video", Symposium on the Virtual Reality Modeling Language. Proceedings of VMRL Workshop, Dec. 14, 1995, pp. 25-31.

Extended Eurpoean Search Report for Application No. 14183868.0 dated Jan. 28, 2015.

Examiner Report for European Patent Application No. 14183868.0 dated Dec. 14, 2016.

* cited by examiner

SYSTEM AND METHOD FOR GRAPHICALLY ENTERING VIEWS OF TERRAIN AND OTHER FEATURES FOR SURVEILLANCE

BACKGROUND

Surveillance systems are employed in a wide range of applications. Street corners may include image acquisition devices that are fixed to a stationary object to conduct surveillance of traffic and pedestrians. Similarly, buildings may employ image acquisition devices that are likewise fixed at stationary positions within the building to monitor activities of persons and objects.

Surveillance systems are also used to acquire intelligence information for law enforcement and military organizations. Such surveillance systems are often used to acquire surveillance data from varying geographical locations as well as varying views of the geographic locations. The surveillance data may be acquired from fixed data acquisition devices and/or mobile data acquisition devices. However, the specific geographic information used to identify the area that is to be subject to surveillance is typically entered using typewritten entries of alphanumeric characters through a keyboard. Keyboard entry of this information is complicated since it requires the user to have a substantial amount of alphanumeric information corresponding to the area that is to be subject to surveillance information before it can be entered into the surveillance system.

SUMMARY

A surveillance system is disclosed that includes one or more data acquisition devices, an image database, and a processing system. The data acquisition devices are configured to acquire surveillance data from one or more geographic locations, and the image database stores image data for the one or more geographic locations. The processing system is configured to electronically display an image of one or more of the geographic locations using the image data stored in the image database. The processing system is further configured to accept input through a user interface to allow graphical manipulation of the displayed image in three-dimensional space to select a view of the geographical location that is to be subject to surveillance by the data acquisition devices. The displayed image selected by the user is employed to generate acquisition parameters for controlling the one or more data acquisition devices to surveil the geographical location corresponding to the displayed image.

The features, functions, and advantages that have been discussed can be achieved independently in various embodiments or may be combined in yet other embodiments further details of which can be seen with reference to the following description and drawings.

DETAILED DESCRIPTION

Figure 1:
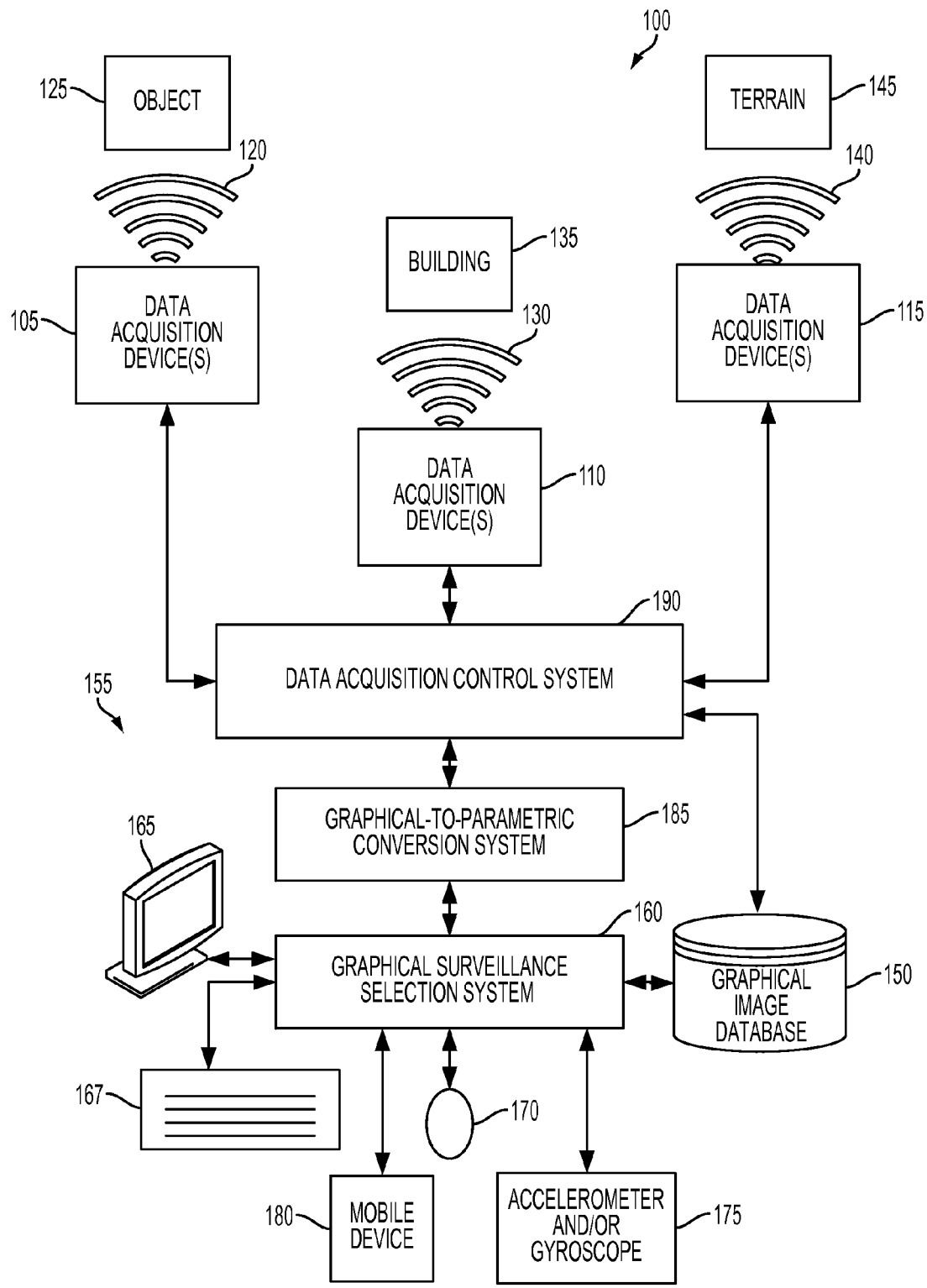
FIG. 1 is an illustration of a surveillance system that allows selection of an area that is to be subject to surveillance using three-dimensional graphical manipulation of an image.

FIG. 1 is an illustration of a surveillance system 100 that allows selection of an area that is to be subject to surveillance using three-dimensional graphical manipulation of an image. The surveillance system 100 includes a plurality of data acquisition devices 105, 110, and 115. Data acquisition device(s) 105 is configured to acquire surveillance data within field of view 120 that includes object 125. Data acquisition device(s) 110 is configured to acquire surveillance data within field of view 130 that includes building 135. Data acquisition device(s) 115 is configured to acquire surveillance data within field of view 140 that includes terrain 145. One or more of the data acquisition devices may be configured so that their respective fields of view are varied in response to signals provided from other portions of the surveillance system 100.

In this example, the object 125, building 135, and terrain 145, may be at substantially different geographical locations where there is no overlap in the data acquisition areas. In such instances, the data acquisition device(s) 105 may be disposed at the geographic location that includes object 125, data acquisition device(s) 110 may be disposed at the geographic location that includes building 135, and data acquisition device(s) 115 may be disposed at the geographic location that includes terrain 145.

The data acquisition device(s) may include a plurality of acquisition devices. The data acquisition devices may be configured to acquire various types of surveillance data. The various types of surveillance data may include: 1) visual image data; 2) infrared data; 3) radio frequency data; 4) magnetometer data (from a magnetometer sensor); 5) explosive material detection data (from an explosive materials detector); and/or 6) facial recognition detection data from, for example, locally executed facial recognition software. It will be recognized, however, that other types of surveillance data may be acquired by corresponding acquisition devices designed to acquire such other surveillance data types.

The surveillance system 100 also includes a graphical image database 150. The image database stores image data for one or more geographic locations. In FIG. 1, the graphical image database 150 stores image data for the locations that include object 125, building 135, and terrain 145. The image data may be in the form of three-dimensional image data.

A processing system 155 is configured to execute a number of different operations using a number of different processing components. In this example, the processing system 155 is configured to electronically display an image of one or more of the geographic locations using the image data stored in the graphical image database 150. To this end, the processing system 155 includes a graphical surveillance selection system 160 that receives graphical image data from the graphical image database 150 and displays the received image data on electronic display 165.

The processing system 155 is also configured to accept input through a user interface to allow graphical manipulation of the displayed image by a user. The graphical manipulation is in three-dimensional space and allows the user to graphically select an image corresponding to an area that is to be subject to surveillance by one or more of the data acquisition devices 105, 110, and/or 115. As the user graphically manipulates the image in three-dimensional space, the manipulated image is shown to the user on electronic display 165. Additionally, or in the alternative, the manipulated image may be shown to the user on more than one display. When more than one display is used, the user may concurrently view separate surveillance areas. For example, a "before manipulation" image may be shown on one display and an "after manipulation" image on the other. The "after manipulation" image on one display may be transferred to replace the "before manipulation" image on the other display to hone selection of the surveillance area by allowing the user to concurrently utilize slightly different views of the overall target surveillance area during graphical manipulation.

The graphical surveillance selection system 160 may receive user input from one or more user input devices to graphically manipulate the displayed image. Here, the graphical surveillance selection system 160 allows the user to manipulate the displayed image using, for example: 1) keys on a keyboard 167 (i.e., different keys providing different directions of movement through the image in three-dimensional space); 2) a mouse or other pointing device 170; 3) a touchscreen incorporated into electronic display 165; 4) an accelerometer and/or gyroscope 175 (i.e., a virtual reality input device); and/or 5) a mobile device 180. In one example, at least the graphical surveillance selection system 160 and the electronic display 165 may be integrated into a single mobile device.

The processing system 155 uses the graphically selected view of the displayed image to generate acquisition parameters for controlling one or more of the data acquisition devices. In FIG. 1, the graphical surveillance selection system 160 communicates data corresponding to the graphically selected view of the displayed image to a graphical-to-parametric conversion system 185. The graphical-to-parametric conversion system 185 uses this data to generate parameters employed to ultimately control one or more of the data acquisition devices 105, 110, and/or 115.

The parametric data generated by the graphical-to-parametric conversion system 185 may be provided to a data acquisition control system 190. The data acquisition control system 190, in turn, uses the parametric data to control the data acquisition devices by communicating either the parametric data or control data derived from the parametric data to the data acquisition devices. To this end, the data acquisition control system 190 is configured for communication with each of the data acquisition devices. Such communication may be by means of: 1) a wireless network; 2) the Internet or other wide area network; and/or 3) radio frequency communication links. Other means for communication may also be employed.

A substantial number of data acquisition parameter types may be generated through the three-dimensional graphical manipulation. For example, the parameters may include: 1) latitude parameters; 2) longitude parameters; 3) altitude parameters; 4) azimuth parameters; 5) elevation parameters; 6) zoom parameters; and/or 7) field of view parameters. The user may also manually select the type of sensor (i.e. visual image sensor, infrared sensor, etc.) that is to be used for the surveillance. Additionally, or on the alternative, the user may select the type of data that is to be acquired (i.e., visual image data, infrared data, etc.) The graphical-to-parametric conversion system 185 and/or the data acquisition control system 190 may select the appropriate sensor type based on the input of the user.

Other parameters that may input by the user relate to time. For example, the user may input the start and end time during which surveillance data is to be acquired, the start and duration during which surveillance data is to be acquired, etc.

Surveillance data is received from the data acquisition devices by the data acquisition control system 190. The acquired surveillance data corresponding to the selected surveillance area may be attached as metadata to an image corresponding to the selected surveillance area. The newly acquired surveillance data may then be reviewed by the user using the graphical surveillance selection system 160 to display the surveillance area on electronic display 165 along with the corresponding new image and/or metadata for the surveillance area as provided by the graphical image database 150.

The graphical image database 150 may include initial graphic information for various surveillance areas. This initial graphic information may or may not include images that have been updated with the latest acquired image surveillance data. When the acquired surveillance data is visual image data, the visual image data may be used to update the portions of the graphical image database 150 associated with the selected surveillance area so that the user manipulates the latest visual image of the area.

Figure 2:
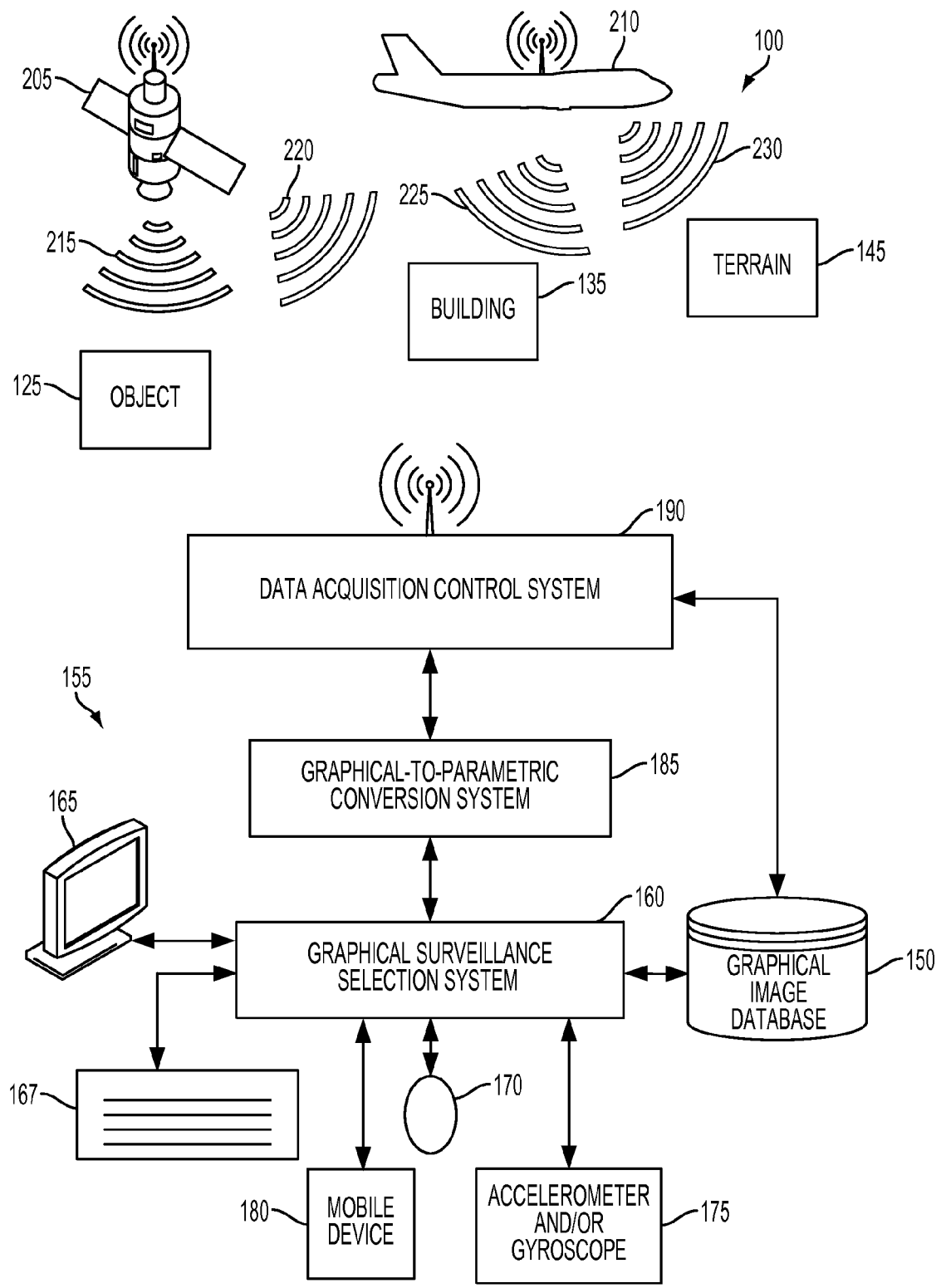
FIG. 2 is an illustration of a further surveillance system that allows selection of an area that is to be subject to surveillance using three-dimensional graphical manipulation of an image.

FIG. 2 shows the surveillance system 100 using a different set of data acquisition devices. Here, the data acquisition devices are mobile aerial devices and include a satellite 205 and an aircraft 210 (or drone). Satellite 205 is configured to acquire surveillance data within field of view 215, which encompasses object 125, as well as data within field of view 220, which encompasses building 135. Aircraft 210 is configured to acquire surveillance data within field of view 225, which encompasses building 135, as well as within field of view 230, which encompasses terrain 145. In this example, therefore, both satellite 205 and aircraft 210 have overlapping fields of view which include building 135. Surveillance data for building 135 may be acquired by the satellite 205 and aircraft 210 concurrently or at different times. Additionally, or in the alternative, surveillance data for different views of the building 1135 may be acquired by the satellite 205 and aircraft 210. The surveillance data from the aircraft 210 may be transmitted in real time over a radio frequency communication link or transferred to the graphical image database 150 upon landing.

FIGS. 3-7 are various views showing the graphical manipulation of an image in three-dimensional space for selecting a target area that is to be subject to surveillance by one or more data acquisition devices. Each figure includes a screenshot 300 that may be shown on electronic display 165 pursuant to selecting the target area. The screenshot 300 includes an image portion 305 displaying an image of the selected surveillance area. Optionally, the screenshot 300 may include an information portion 307 displaying various parameters associated with the selected surveillance area, and a surveillance request portion 309 including one or more activation buttons 311 for initiating the surveillance request. The surveillance request portion may also indicate a feedback area 313 indicating that the surveillance request has been initiated and providing an ETA at which the user can expect to receive the surveillance data. In these examples, all the values of the parameters in information portion 307 are designated with the variable "XXXX." However, it will be recognized that the value of these variables change as the user manipulates the image portion 305 in three-dimensional space. Also, more or fewer parameters may be used and/or displayed depending on system requirements.

Figure 3:
FIGS. 3-7 are various views of graphical manipulation of an image in three-dimensional space for selecting a target area that is to be subject to surveillance by one or more data acquisition devices.

FIG. 3 is an example showing one image that may be used to designate the area that is to be subject to surveillance. Images such as the one shown in FIG. 3 may be obtained by aerial data acquisition devices on, for example, satellite 205 and/or aircraft 210. As shown, the selected surveillance image of FIG. 3 includes streets, rivers, and a cluster of buildings 310.

Figure 4:
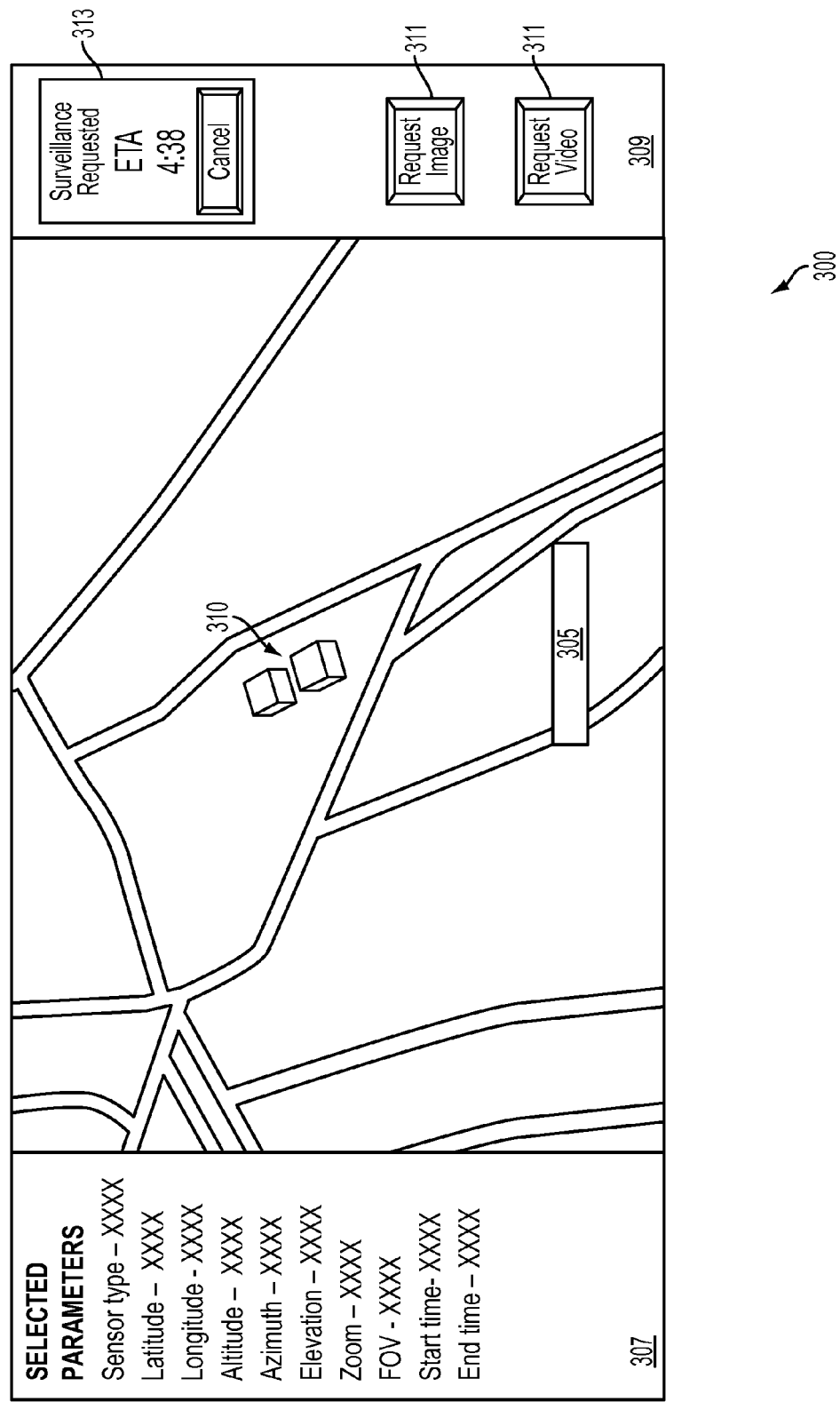

FIG. 4 shows one manner in which the user may manipulate the selected surveillance image of FIG. 3 to more particularly focus on the cluster of buildings 310. In the transition to the selected surveillance image of FIG. 4, a field of view adjustment, an altitude adjustment, a lateral displacement, and a transverse displacement of the image of FIG. 3 have been executed by the user in three-dimensional image space. The cluster of buildings 310 is now centrally located in the selected surveillance image of FIG. 4 and the field of view has been adjusted to principally focus on the cluster of buildings 310.

Figure 5:
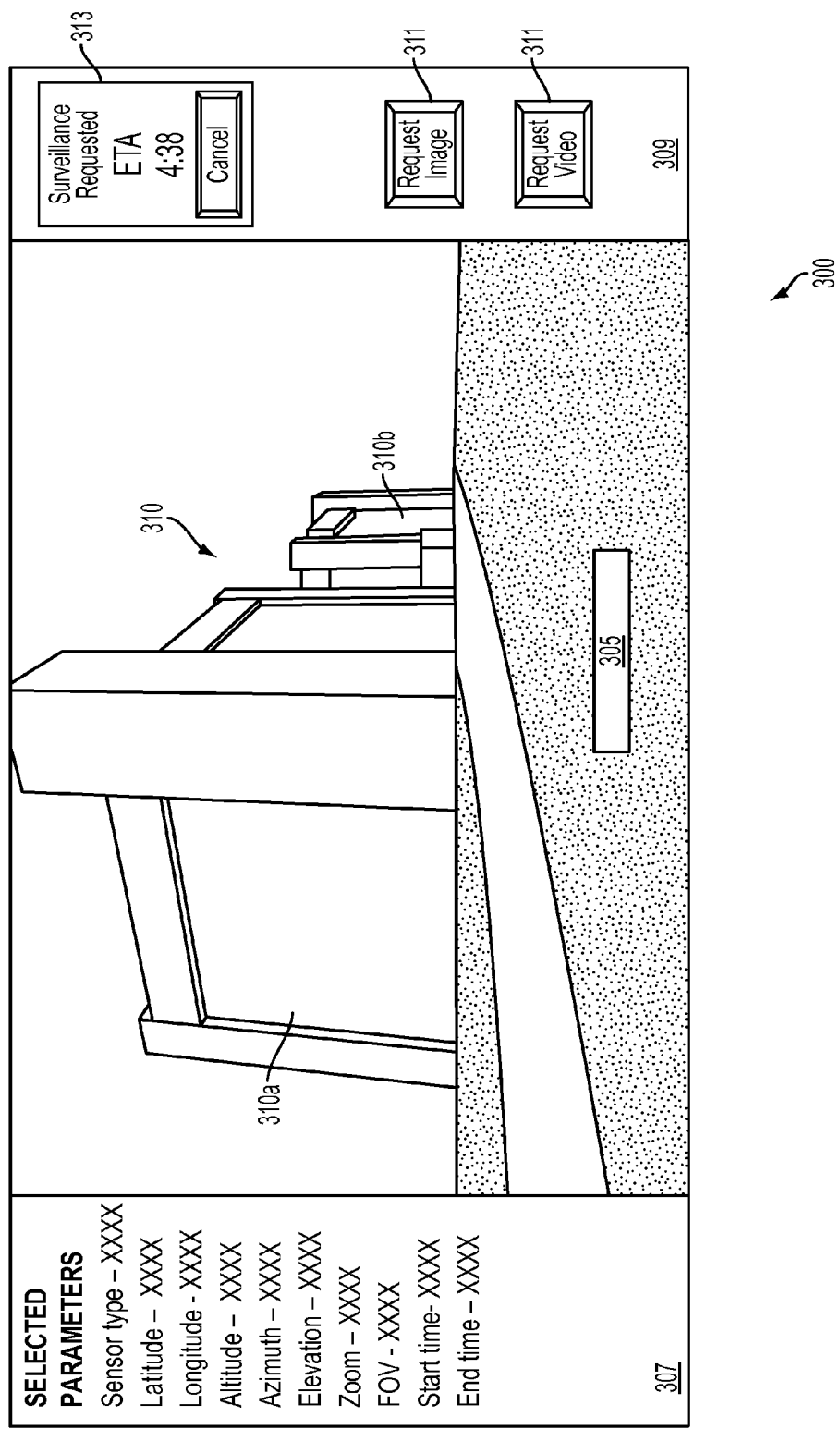

FIG. 5 shows one manner in which the user may manipulate the selected surveillance image of FIG. 4 in three-dimensional space to more particularly focus on elevated views of the cluster of buildings 310 for surveillance. In the transition to the selected surveillance image of FIG. 5, an elevation adjustment, an azimuth adjustment, a field of view adjustment, an altitude adjustment, a lateral displacement, and a transverse displacement of the image of FIG. 3 have been executed by the user in three-dimensional image space. The resulting selected surveillance image of FIG. 5 principally includes a front view of building 310a with minimal portions of the sides of both buildings 310a and 310b.

Figure 6:
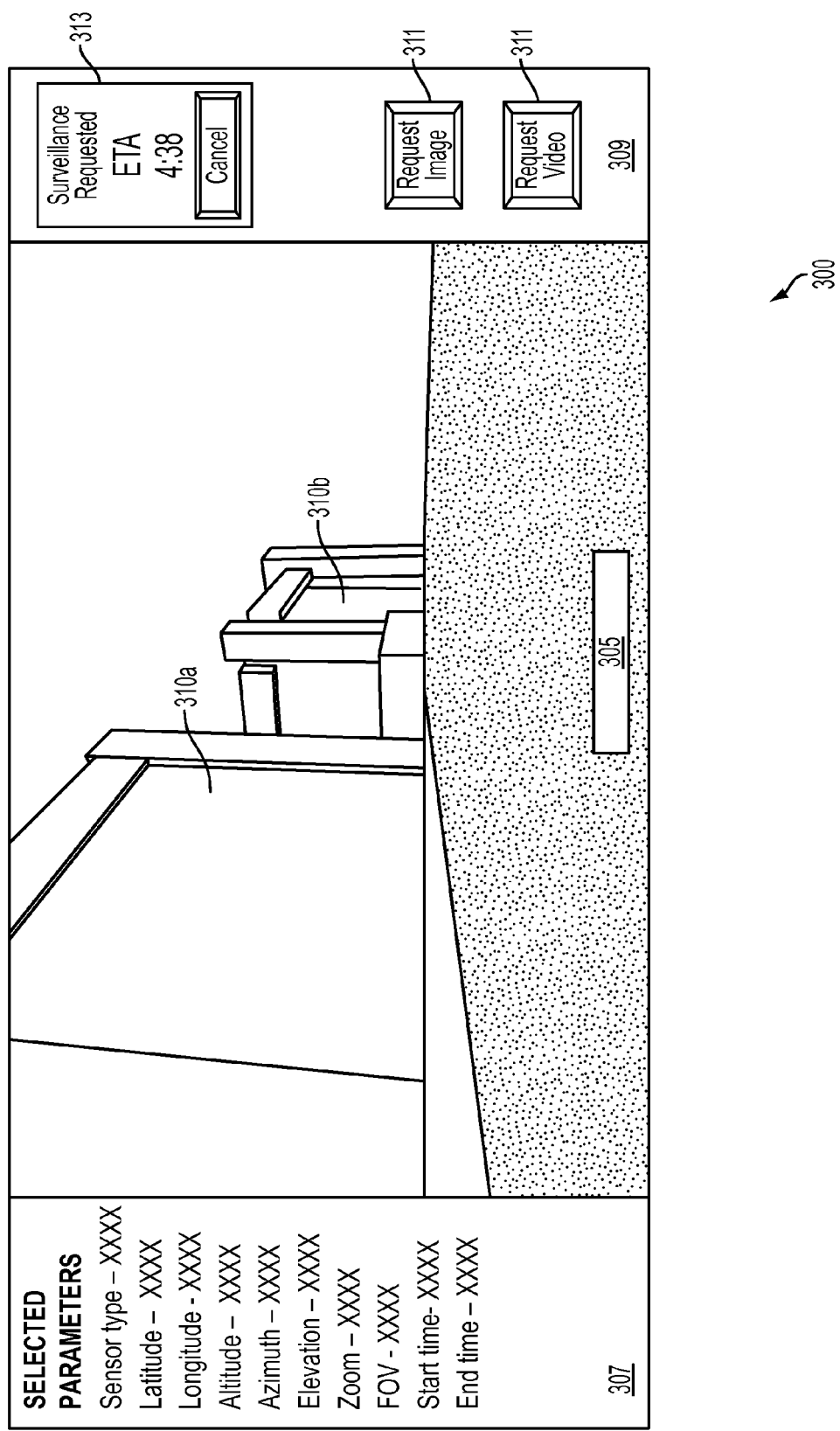

FIG. 6 shows one manner in which the user may manipulate the selected surveillance image of FIG. 5 in three-dimensional space to more particularly focus on elevated side views of the cluster of buildings 310 for surveillance. In the transition to the selected surveillance image of FIG. 6 further operations in response to user manipulation of the image of FIG. 5 in three-dimensional space have been executed. The resulting selected surveillance image of FIG. 6 principally includes a side view elevations of both building 310a with minimal portions of the front side of buildings 310a and 310b.

Figure 7:
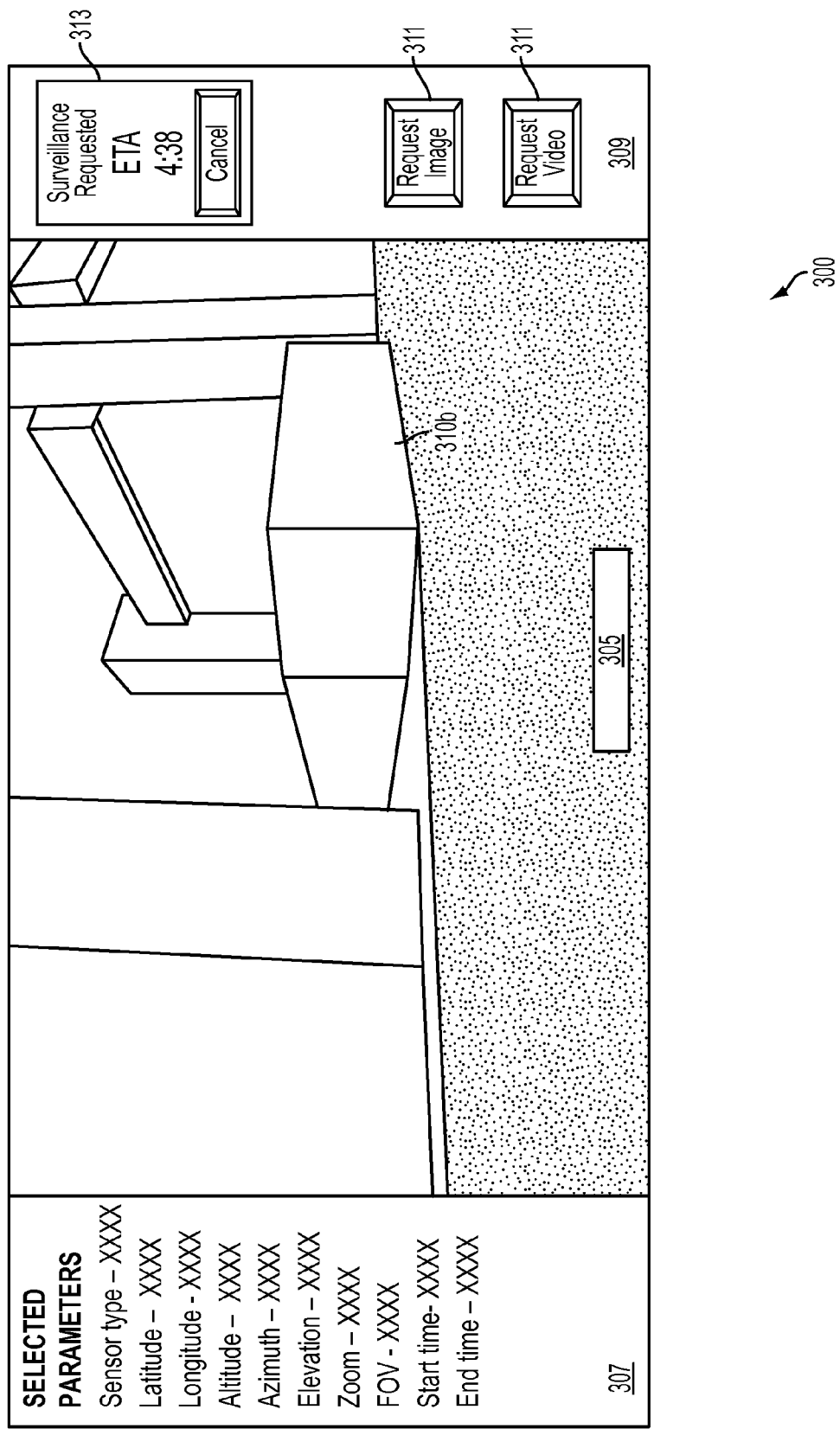
Figure 8:
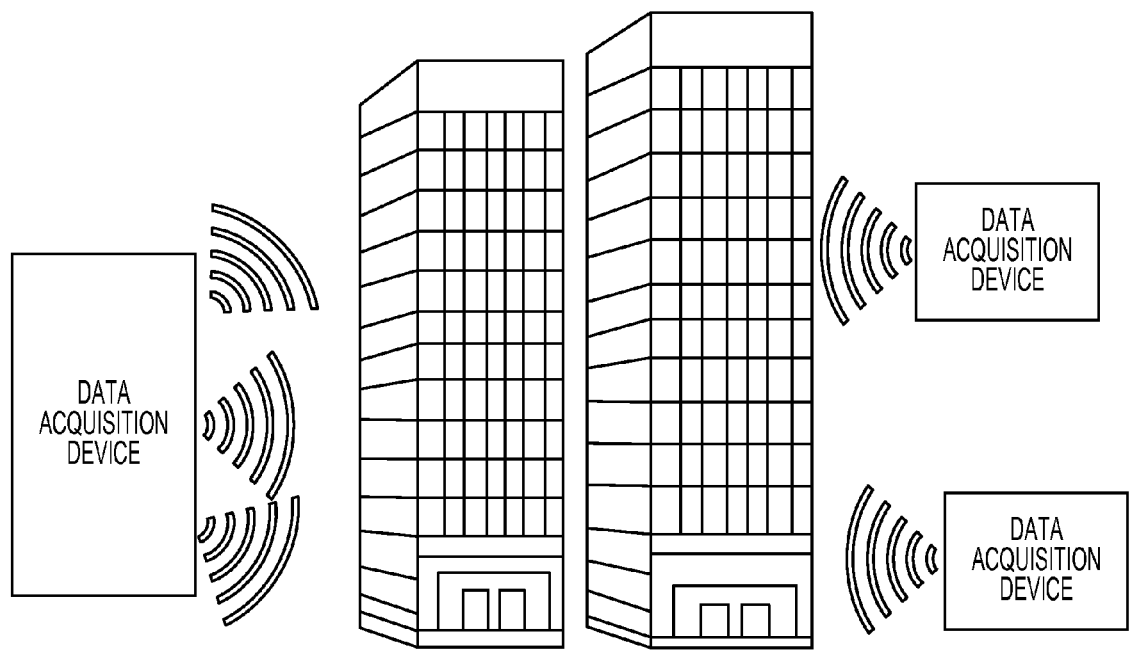
FIG. 8 is an illustration of a plurality of data acquisition devices disposed at a geographic location that includes buildings.

FIG. 7 shows one manner in which the user may manipulate the selected surveillance image of FIG. 6 in three-dimensional space to more particularly focus on elevated side views of the cluster of buildings 310 for surveillance. In the transition to the selected surveillance image of FIG. 7 further operations in response to user manipulation of the image of FIG. 6 in three-dimensional space have been executed. The resulting selected surveillance image of FIG. 7 principally includes a side view elevation of building 310b.

Transitional views of the selected surveillance image between an initial view and a final view may take place in a continuous manner. To this end, the transitions between the selected surveillance images shown in FIG. 3 through FIG. 7 are merely exemplary and do not represent a definitive sequence of graphical manipulations to arrive at a final selected surveillance image. For example, a transition from the selected surveillance image of FIG. 3 to any one of the selected surveillance images of FIG. 4 through FIG. 7 may be continuous. It will be recognized that other three-dimensional manipulations may be used to transition from an initial image to a final selected surveillance image.

The invention claimed is:

1. A surveillance system comprising:
   one or more data acquisition devices configured to acquire surveillance data from one or more geographic locations;
   an image database storing image data for the one or more geographic locations; and
   a processing system configured to:
      electronically display an image of one or more of the geographic locations using the image data stored in the image database;
      accept input through a user interface to allow graphical manipulation of the displayed image by a user, wherein the graphical manipulation is in three-dimensional space, and wherein the graphical manipulation allows the user to graphically select a view of the one or more geographic locations that is to be subject to surveillance by the one or more data acquisition devices; and
      use the graphically selected view of the displayed image to generate acquisition parameters for controlling the one or more data acquisition devices, wherein the one or more data acquisition devices are moved by a drone from one geographical position to another geographical position by changing the graphically selected view of a three-dimensional view corresponding to the one or more geographical locations.

2. The surveillance system of claim 1, wherein the electronically displayed image of the one or more geographic locations and the user interface are incorporated into a mobile device.

3. The surveillance system of claim 1, wherein at least one of the data acquisition devices is an image acquisition device.

4. The surveillance system of claim 1, wherein the one or more data acquisition devices comprise a plurality of image acquisition devices.

5. The surveillance system of claim 1, wherein the one or more data acquisition devices are disposed at a plurality of separate geographic locations.

6. The surveillance system of claim 1, wherein the plurality of data acquisition devices are disposed to monitor a single geographic location.

7. The surveillance system of claim 1, wherein the one or more data acquisition devices comprise at least one of an infrared sensor and/or a magnetometer sensor.

8. The surveillance system of claim 1, wherein the acquisition parameters include field of view parameters.

9. The surveillance system of claim 1, wherein the acquisition parameters include an elevation parameter and an azimuth parameter.

10. The surveillance system of claim 1, wherein the acquisition parameters include a latitude parameter, a longitude parameter, and an altitude parameter.

11. The surveillance system of claim 1, wherein the acquisition parameters include a time parameter.

12. The surveillance system of claim 1, wherein the acquisition parameters include a sensor type parameter.

13. The surveillance system of claim 1, wherein the user interface comprises one or more of a pointing device, a keyboard, a touchscreen, a mobile device, an accelerometer, or gyroscope.

14. The surveillance system of claim 1, further comprising a data acquisition control system configured to transmit control data to the one or more acquisition devices based on the acquisition parameters.

15. The surveillance system of claim 10, further comprising a data acquisition control system configured to receive the surveillance data from the one or more data acquisition devices for display to the user.

16. The surveillance system of claim 11, wherein the surveillance data comprises image data, and wherein the surveillance system further comprises a database update system configured to update the image data stored in the image database.

17. The surveillance system of claim 1, wherein the one or more acquisition devices include an explosive materials detector.

18. The surveillance system of claim 1, wherein the one or more acquisition devices include locally executed facial recognition software.

19. A surveillance system comprising:
an image database storing image data for one or more geographic locations that may be subject to surveillance;
a graphical surveillance selection system configured to allow a user to manipulate a displayed image obtained from the image database in three-dimensional space to designate a view of the one or more geographic locations that is to be subject to surveillance by one or more data acquisition devices; and
a graphical-to-parametric conversion system configured to receive data corresponding to the designated view of the one or more geographical locations that is to be subject to surveillance from the graphical surveillance selection system, wherein the graphical-to-parametric conversion system converts the received data to acquisition parameters employed to control the one or more data acquisition devices, wherein the one or more data acquisition devices are moved by a drone from one geographical position to another geographical position by changing the designated view of a three-dimensional view corresponding to the one or more geographical locations.

20. The surveillance system of claim 19, further comprising a data acquisition control system configured to use the acquisition parameters to control the one or more data acquisition devices and to receive surveillance data from the one or more data acquisition devices.

21. The surveillance system of claim 20, wherein the data acquisition control system communicates acquisition parameters and/or control signals corresponding to the acquisition parameters to the one or more data acquisition devices.

22. The surveillance system of claim 19, wherein the graphical surveillance selection system is incorporated into a mobile device.

23. The surveillance system of claim 19, wherein the acquisition parameters include an azimuth parameter and elevation parameter.

24. The surveillance system of claim 19, wherein the acquisition parameters include a latitude parameter, longitude parameter, and an altitude parameter.

25. The surveillance system of claim 19, wherein the acquisition parameters include a time parameter.

26. The surveillance system of claim 19, wherein the plurality of data acquisition devices are disposed to monitor a single geographic location.

27. The surveillance system of claim 19, wherein the one or more data acquisition devices comprise at least one of an infrared sensor and/or a magnetometer sensor.

28. The surveillance system of claim 19, wherein the acquisition parameters include field of view parameters.

29. A method of conducting surveillance comprising:
electronically displaying an image of one or more geographic locations associated with one or more data acquisition devices, wherein the displayed image is generated using three-dimensional image data stored in an image database;
accepting user input to graphically manipulate the displayed image in three-dimensional space to select a view of the displayed image corresponding to the one or more geographic locations that are to be subject to surveillance; and
using the selected view of the displayed image to generate acquisition parameters for controlling the one or more image acquisition devices, wherein the one or more image acquisition devices are moved by a drone from one geographical position to another geographical position by changing the selected view of a three-dimensional view corresponding to the one or more geographical locations.

30. The method of surveillance of claim 29, wherein the generated acquisition parameters include a parameter selected from the group of a latitude parameter, a longitude parameter, an elevation parameter, an altitude parameter, an azimuth parameter, a field of view parameter, a zoom parameter, a time parameter, and a sensor type parameter.

* * * * *